(12) United States Patent
De Angel et al.

(10) Patent No.: US 7,657,722 B1
(45) Date of Patent: Feb. 2, 2010

(54) METHOD AND APPARATUS FOR AUTOMATICALLY SECURING NON-VOLATILE (NV) STORAGE IN AN INTEGRATED CIRCUIT

(75) Inventors: Edwin De Angel, Austin, TX (US); Jorge Antonio Abullarade, Austin, TX (US); Jean Charles Pina, Austin, TX (US); Rahul Singh, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 387 days.

(21) Appl. No.: 11/772,136

(22) Filed: Jun. 30, 2007

(51) Int. Cl.
*G06F 12/00* (2006.01)
(52) U.S. Cl. .................. 711/163; 711/156; 365/185.04; 365/185.33; 365/189.03; 365/195; 713/1; 713/100
(58) Field of Classification Search ............... 711/163, 711/156; 365/185.04, 185.33, 189.03, 195; 713/1, 100
See application file for complete search history.

(56) References Cited

U.S. PATENT DOCUMENTS

| | | | |
|---|---|---|---|
| 5,469,557 A | 11/1995 | Salt et al. | |
| 5,546,561 A * | 8/1996 | Kynett et al. | 711/163 |
| 6,188,602 B1 * | 2/2001 | Alexander et al. | 365/185.04 |
| 7,210,012 B2 * | 4/2007 | Lee et al. | 711/163 |
| 2002/0157010 A1 * | 10/2002 | Dayan et al. | 713/191 |
| 2003/0037237 A1 * | 2/2003 | Abgrall et al. | 713/166 |
| 2004/0039924 A1 * | 2/2004 | Baldwin et al. | 713/189 |
| 2005/0120236 A1 | 6/2005 | Witmann | |
| 2006/0283216 A1 * | 12/2006 | Marcelle et al. | 70/38 A |

\* cited by examiner

*Primary Examiner*—Stephen C Elmore
(74) *Attorney, Agent, or Firm*—Andrew M. Harris; Mitch Harris, Atty at Law, LLC

(57) ABSTRACT

A method and apparatus for automatically securing non-volatile (NV) storage in an integrated circuit provides improved resistance to code copying and reverse-engineering attacks. External interfaces that provide read access to the NV storage are be disabled, for a predetermined time after a reset or other initialization signal is received. An internal lock state bit or key is checked as well as an external lock prevent indication. If the lock prevent indication is not received, or the internal lock state bit is already set, then the integrated circuit is operated under a locked condition, in which external access to the NV storage values is prevented. The lock prevent indication may be a signal provided during reset of the integrated circuit on a terminal that is used for another purpose after initialization of the integrated circuit.

22 Claims, 5 Drawing Sheets

METHOD AND APPARATUS FOR AUTOMATICALLY SECURING NON-VOLATILE (NV) STORAGE IN AN INTEGRATED CIRCUIT

BACKGROUND OF THE INVENTION

1. Field of the Invention

The present invention relates generally to integrated circuits including non-volatile storage, and more specifically, to a method and apparatus that automatically secure non-volatile (NV) storage from external intrusion.

2. Background of the Invention

A significant amount of the value contained in micro-controllers and other integrated circuits having non-volatile (NV) storage is in the proprietary program code and data stored in the integrated circuit. Without a method and circuit for securing the program code against read operations, the intellectual property (IP) contained therein can be easily copied and used by unauthorized persons. While micro-controllers and other integrated circuits such as one-time programmable (OTP) memory, and logic such as programmable logic devices (PLDs), have long included protection circuits, such as one-time fuses that control read mechanisms, techniques have been developed to get around such mechanisms to obtain the IP.

In particular, in micro-controllers, software pirates have used techniques to gain control of the processor core or scan logic interfaces by manipulating clock and control logic signals in a manner that defeats the protection mechanisms. For example, if a micro-controller core reads a "secured" bit that indicates that the program code has been secured prior to disabling functionality that might provide access to the values stored in the program code, then if the micro-controller can be manipulated to change its intended execution path, then the micro-controller might be forced to bypass the protection mechanisms and grant access to the IP. If access to the non-volatile storage can be accomplished through a programming interface such as Joint Tactical Action Group (JTAG) interface, or a port interface such as a serial port protocol provided for programming and verifying an integrated circuit NV storage, then the security is overcome.

While a one-time fuse can be used to provide a total bar to external access to the NV storage, signal manipulation techniques, such as those described above, can be employed to gain external access via what is treated as an internal access by the logic, and further a one-time fuse is disadvantageous in that the integrated circuit can typically only be programmed once, making debugging problems in the field very difficult. Other security techniques such as password/key matching have been employed to provide access to the read interface and/or programming interfaces of an integrated circuit having NV storage. However, simple password/key match techniques can be defeated by repetitive trial-and-error attacks.

Therefore, it is desirable to provide a method and apparatus having improved security for program code and other NV storage. It would further be desirable to provide a mechanism that can automatically lock NV storage in an integrated circuit.

SUMMARY OF THE INVENTION

The above stated objectives of providing improved security of NV storage and automatic locking after a field upgrade is accomplished in a method and apparatus that automatically secure NV storage unless specific techniques are applied to leave the NV storage unprotected.

The apparatus is a circuit which is part of a micro-controller core or other integrated circuit containing the NV storage and may be a logic-only circuit or portions of the circuit may include a processor core acting under program control. Upon receiving a reset or other initialization startup signal, the apparatus delays enabling internal units that may provide access to the NV storage, for example JTAG interfaces and serial port programming interfaces within the integrated circuit. The delay is provided for a predetermined time interval in which the internal lock state of the NV storage is checked and an external stimulus is checked-for, indicating that locking should be prevented. If the lock-prevent indication is not received, or the internal lock state was already set, then the internal units are initialized under locked conditions. For example, JTAG interfaces and serial port interfaces can be initialized so that NV read protocols are disabled. In particular, the JTAG output circuit may be data-blocked during the predetermined interval when a locked or locking condition is present.

If the lock prevent indication was present in association with the reset or other initialization signal, then the program read interfaces can be enabled and the non-volatile storage operated as unlocked. The lock prevent mechanism can be a signal provided from a general-purpose input/output (GPIO), a control pin, or other hardware mechanism which can be used for a different purpose after initialization.

The foregoing and other objectives, features, and advantages of the invention will be apparent from the following, more particular, description of the preferred embodiment of the invention, as illustrated in the accompanying drawings.

DESCRIPTION OF ILLUSTRATIVE EMBODIMENT

The present invention encompasses an apparatus and method that provide security over access to the contents of non-volatile (NV) storage. NV storage in the context of the present invention applies to storage that is static without the application of power supplies, such as FLASH memory, non-volatile random access memory (NVRAM), and read-only memories (ROMs), but also to any storage that has retained values subsequent to a reset of the integrated circuit, including battery backed-up random access memory (RAM) and the like. In general, the techniques of the present invention are suitable for protecting both program code and data stored in NV storage.

Figure 1:
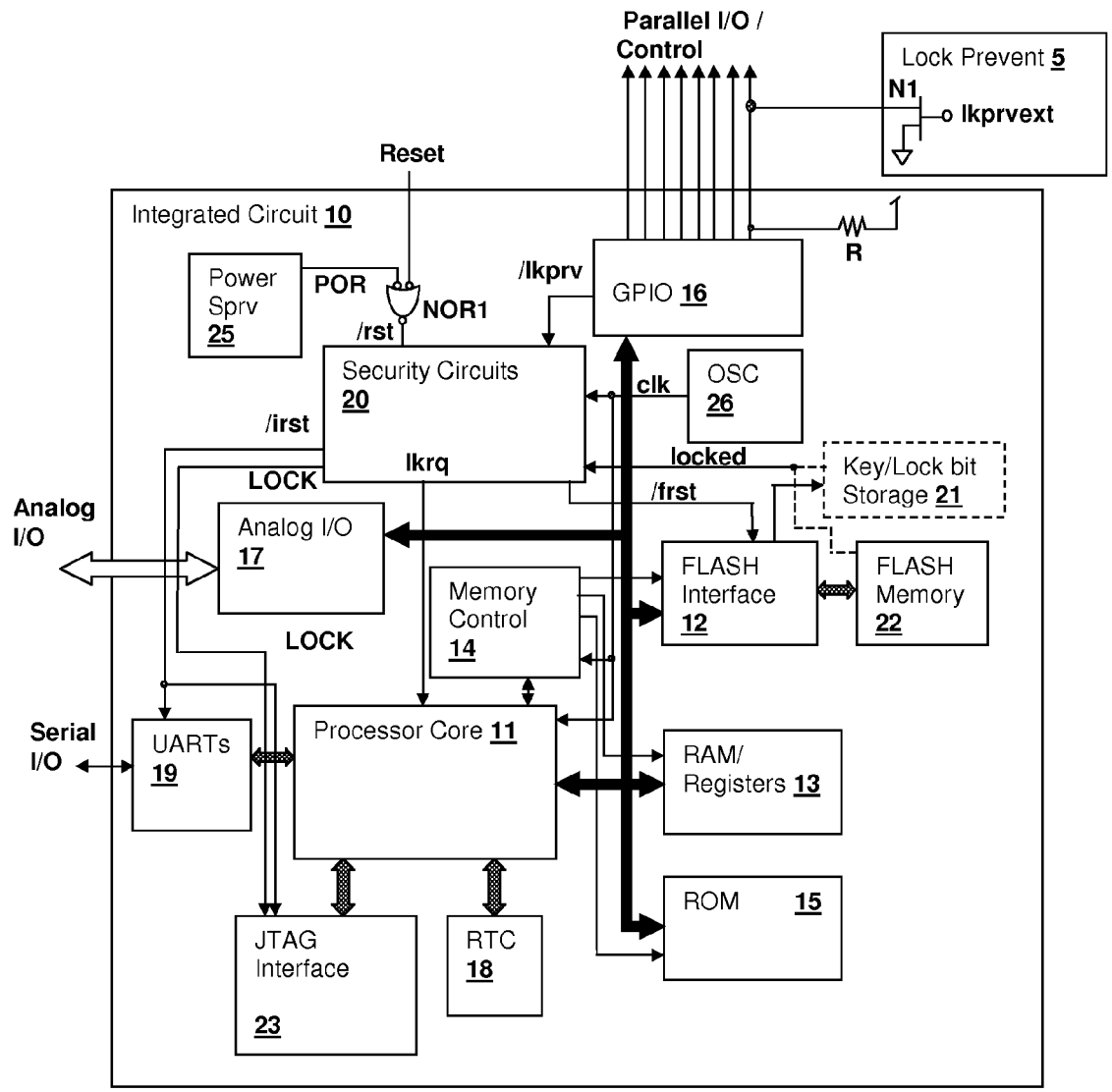
FIG. 1 is a block diagram depicting an integrated circuit in accordance with an embodiment of the present invention.

Referring now to FIG. 1, an integrated circuit 10 in accordance with an embodiment of the invention, is shown. Integrated circuit 10 as depicted, is a general-purpose micro-controller that includes analog input/output terminals Analog I/O, serial input/output terminals Serial I/O and general-purpose input/output terminals Parallel I/O/Control. However, the techniques of the present invention may be applied to other circuits having external readability of internal non-volatile storage, but that do not include processing elements such as processor core 11, as long as an external signal can be tested to determine whether automatic locking of integrated circuit 10 should be over-ridden during initialization.

As depicted, integrated circuit 10 includes processor core 11 connected to a memory control circuit 14 and to ROM 15, RAM/Registers 13 and a FLASH interface 12 that provides access to a FLASH memory 22. Processor core 11 is also coupled to a JTAG interface 23 and universal asynchronous receiver transmitters (UARTs) 19, each of which support a protocol for programming values into FLASH memory 22, erasing FLASH memory 22 and when FLASH memory 22 is unlocked, reading values from FLASH memory 22 in response to external read requests. A real-time clock (RTC) 18 provides a timebase to processor 11, an analog I/O unit 17 provides interfaces to input/output terminals Analog I/O and a general-purpose I/O unit (GPIO) 16 provides pin drivers and receivers for general-purpose input/output terminals Parallel I/O/Control. An on-chip oscillator 26 provides a clock signal clk for operating internal circuits such as processor core 11, and a power supervisory circuit 25 provides a power-on reset signal POR upon application of power, in addition to other optional power monitoring and control functions.

Integrated circuit 10 also includes security circuits 20 that perform securing operations in accordance with embodiments of the present invention. A logical-NOR gate NOR1 combines the power-on reset signal POR provided from power supervisory circuit 25 and an external reset signal Reset to form a reset control signal /rst that is provided to security circuits 20 indicating that integrated circuit 10 is being initialized. Security circuits 20 generate two internal reset signal /irst and /frst. Internal reset signal /irst holds various internal circuits in a reset condition, including JTAG interface 23 and UARTs 19, while internal reset signal /frst holds FLASH interface 12 in a reset condition during startup. Internal reset signal /frst terminates earlier than internal reset signal /irst so that locking operations can be performed before other functional units of integrated circuit 10 are released from the reset condition.

Security circuits 20 generate a LOCK signal that indicates that FLASH memory 22 is or should be locked, because either a lock prevention indication was not received, or the state of a key or bit storage indicates that FLASH memory 22 is in a locked state. The key or bit value may be stored in FLASH memory 22, or an optional separate key/lock bit storage 21 may be provided to store the lock bit or key value. Either FLASH memory 22 or key/lock bit storage 21 provides a lock indication locked to security circuits 20, or processor core 11 reads either FLASH memory 22 or key/lock bit storage 21 to retrieve a bit or value that is tested to determine whether or not FLASH memory 22 is locked.

Processor core 11, under control of a boot program stored in ROM 15, reads the state of the LOCK signal, determines whether or not the FLASH memory 12 has already been locked by testing the bit or key value stored in key/lock bit storage 21 or directly in FLASH memory 22, and locks FLASH memory 22 by setting a locked state in key/lock bit storage 21 if FLASH memory 22 has not been locked and a lock prevention indication was not received by security circuits 20 sufficiently early to prevent locking. JTAG interface 23 is responsive to the LOCK signal provided from security circuits 20 and/or to a programmed register value or signal provided by processor core 11 that prevents certain operations that can read stored values from FLASH memory 22. In particular, signal LOCK can be used to directly gate the read output of the JTAG scan chain at JTAG interface 23, so that JTAG interface 23 can be fully operated to receive commands, but valid data cannot be read from integrated circuit 10.

Alternatively or in combination, processor core 11, JTAG interface 23 and UARTs 19 can block all attempts to read the contents of the non-volatile storage in integrated circuit 10 via their respective protocols. Processor core 11 still remains capable of reading all of the non-volatile storage and may have the capability of reading values from the non-volatile storage and transferring those values through one of the external interfaces. However, such access would be intended by the design of the program code provided to processor core 11 and is thus considered permissive access, as opposed to the unauthorized access that is blocked by the action of security circuits 20.

As mentioned above, security circuits 20 perform a lock request, asserting signal lkrq by default, every time integrated circuit 10 is initialized by the application of the external reset signal Reset or cycling of power to integrated circuit 10. However, under some circumstances, it is desirable to leave the non-volatile storage in integrated circuit 10 unlocked and a mechanism is provided for doing so. One of general-purpose input/output terminals Parallel I/O/Control can be driven by an external lock prevent circuit 5, either in a programming device, or in the circuit in which integrated circuit 10 is embedded. The terminal can be used for general/purpose I/O after initialization of integrated circuit 10. A pull-up resistor R assures that absent an activated external pull-down, such as transistor N1 in lock prevent circuit 5, which is responsive to an external lock prevent signal lkprvext, an internal lock prevent signal lkprv will not be asserted during initialization.

Figure 2:
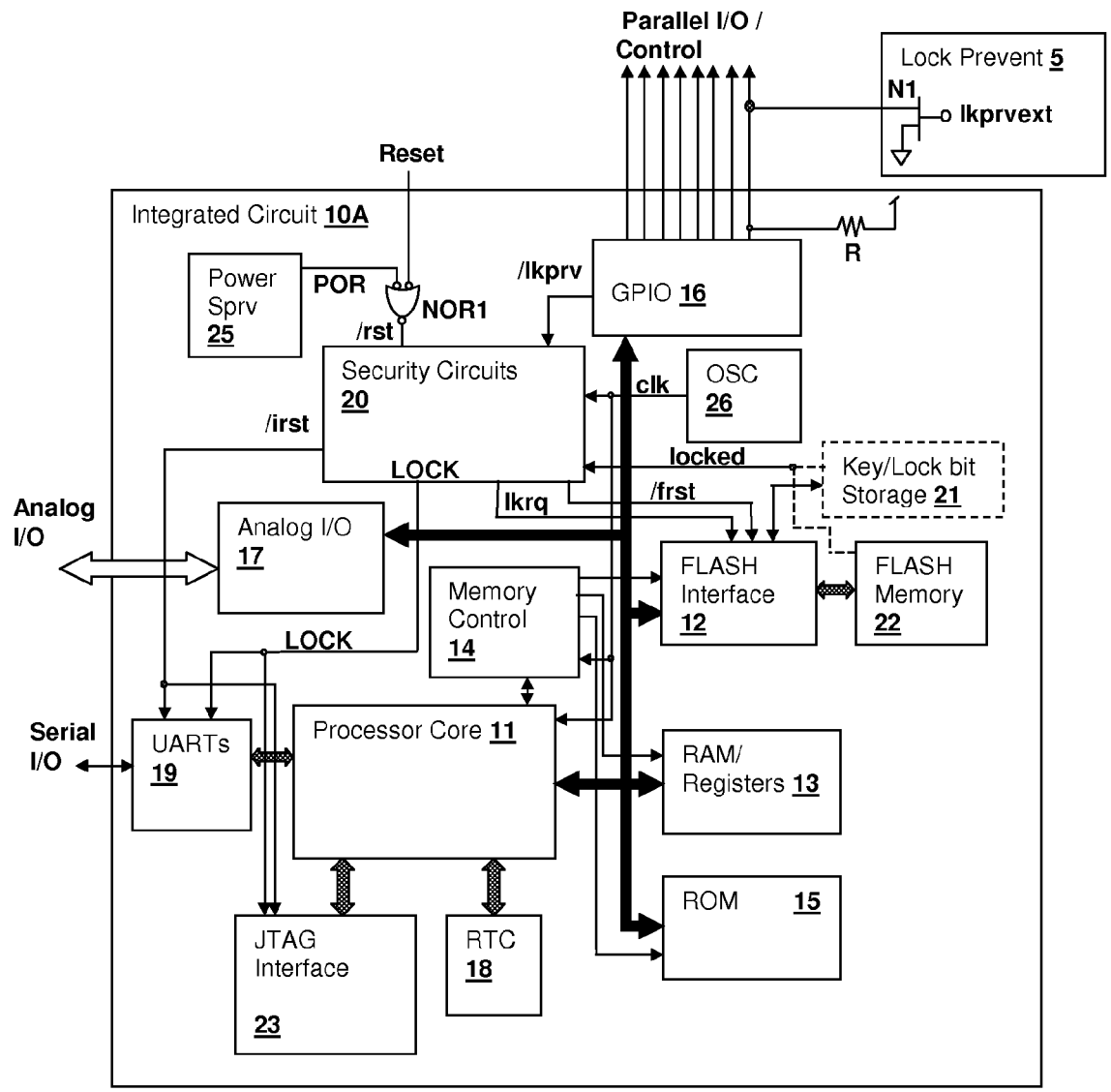
FIG. 2 is a block diagram depicting an integrated circuit in accordance with another embodiment of the present invention.

Referring now to FIG. 2, an integrated circuit 10A, in accordance with another embodiment of the invention is shown. Integrated circuit 10A is similar to integrated circuit 10 of FIG. 1, so only differences between them will be described in detail below. Integrated circuit 10A provides a hardware-only solution to locking FLASH memory 22 that does not require intervention of processor core 11. Logic within FLASH interface 12 receives lock request signal lkrq and locks FLASH memory 22 if signal locked indicates that FLASH memory 22 has not been previously locked. In integrated circuit 10A, signal LOCK is provided directly to UARTs 19 and JTAG interface 23 to prevent reading data from FLASH memory 22 if a lock prevent has not been received or FLASH memory 22 is already locked.

Figure 3:
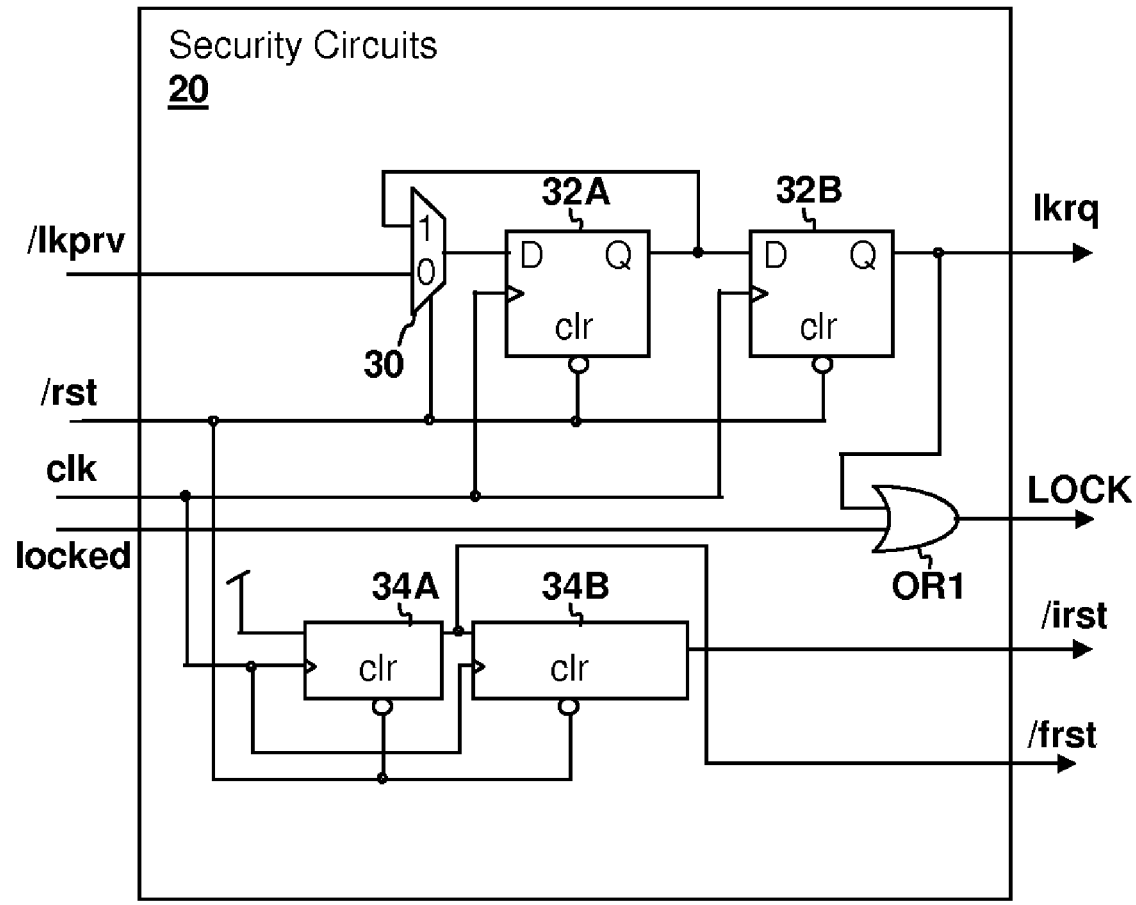
FIG. 3 is a schematic diagram depicting details of security circuit 20 of FIG. 1 and FIG. 2.

Referring now to FIG. 3, details of security circuits 20 are shown. A multiplexer 30 selects between the lock prevent signal lkprv and the output of a D flip-flop 32A, which is clocked by clock signal clk. The selection control is connected to reset signal /rst, so that only when reset signal /rst is active, lock prevent signal lkprv can cause the output of D flip-flop 32A to change, otherwise the present value of D flip-flop 32A is held until the next assertion of reset signal /rst. A second D flip-flop 32B latches the output of D flip-flop 32A in accordance with clock signal clk to generate lock request signal lkrq. Lock signal LOCK is generated by a logical-OR gate OR1 which combines the lock request signal lkrq with the locked signal provided from non-volatile storage, so that elements of integrated circuit 10 that can provide external read access to non-volatile storage are informed to disable their read protocols. A pair of shift registers 34A and 34B are used to generate internal reset signals /irst and /frst. When reset signal /rst is active, all of the registers in shift registers 34A and 34B are held in a cleared state. When reset signal /rst is de-asserted, a logical "1" is clocked through shift registers 34A and 34B, first releasing internal reset /frst, for example after three positive transitions of clock signal clk, and then internal reset /irst is released, for example, five positive transitions of clock signal clk, where shift register 34A is a three-bit shift register and shift register 34B is a five-bit shift register. The timing of internal reset signal /irst assures that JTAG interface 23 and UARTs 19 will not become active until after the LOCK signal has assumed the proper state and internal reset signal /frst has been released to permit processor core 11 or flash interface 12 to perform the locking operation.

Figure 4:
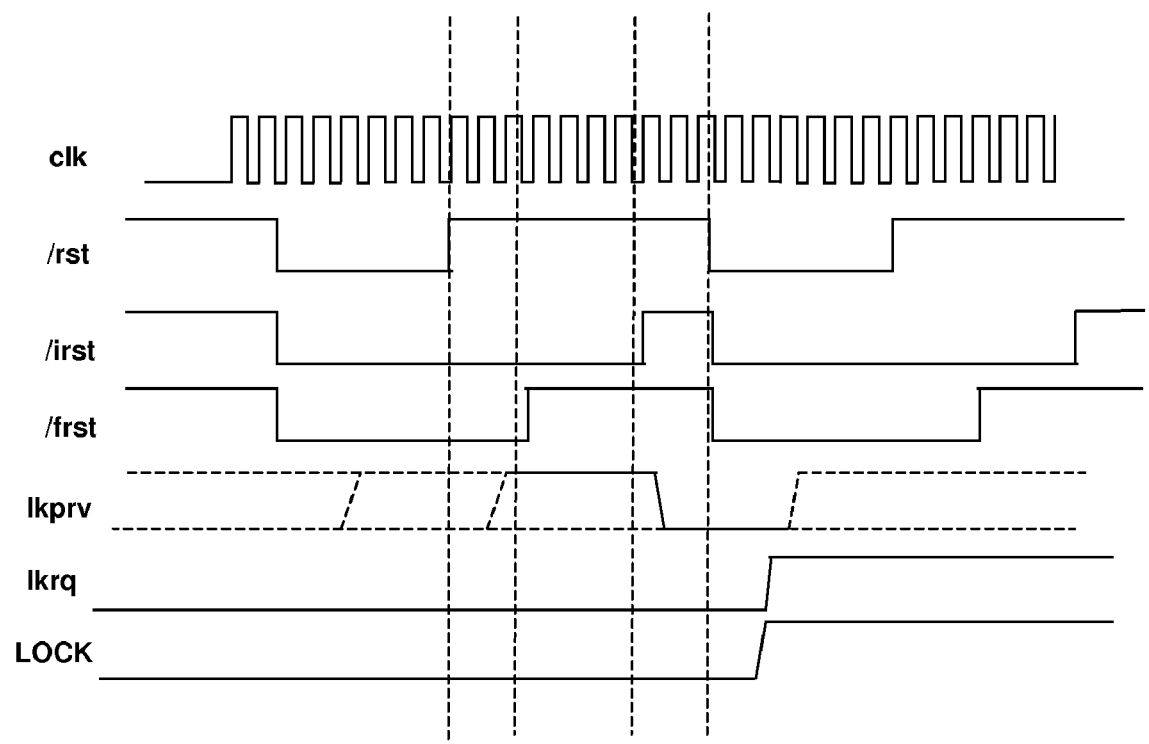
FIG. 4 is a timing diagram depicting a relationship of signals in security circuit 20.

Referring now to FIG. 4, the timing relationships of signals within security circuits 20 circuit of FIG. 3 is shown. The first assertion of reset signal /rst illustrates an initialization process in which locking is prevented by activating lock prevent circuit 5 to pull down the GPIO pin that prevents locking, and in which the internal lock bit or key of integrated circuit 10 has never been set. Lock prevent signal lkprv is asserted prior to the de-assertion of reset signal /rst or sufficiently before the release of internal reset signal /irst, and lock request signal lkrq and the lock signal LOCK are not asserted. The second assertion of reset signal /rst occurs after lock prevent signal lkprv has been de-asserted (i.e., the associated GPIO terminal has been released by lock prevent circuit 5 or lock prevent circuit 5 has been disconnected). Two positive transitions of clock signal clk after the release of lock prevent signal lkprv, both lock request signal lkrq and lock signal LOCK are asserted, blocking external read access to internal non-volatile storage even after internal reset signal /frst is released. Internal reset signal /frst is released three positive transitions of clock signal clk after the release of reset signal /rst and internal reset signal /irst is released five cycles later. The timing described above ensures that internal reset signals /frst and /irst will not be released until after either a valid lock prevent signal lkprev is captured, or the lock request signal lkrq is asserted, which asserts lock signal LOCK and starts an operation to write the lock bit or key that will maintain lock signal LOCK in an asserted state until the non-volatile storage is erased.

Figure 5:
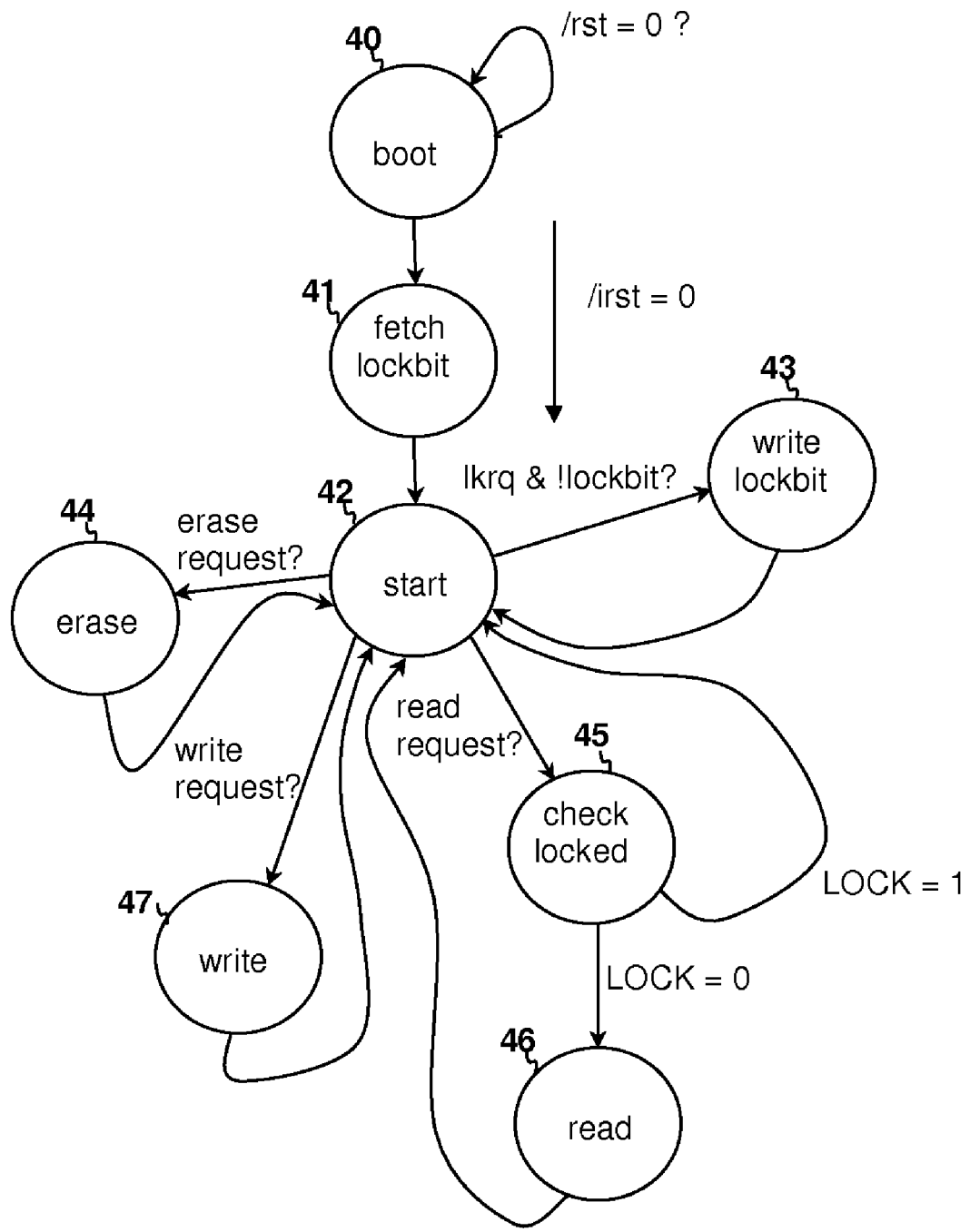
FIG. 5 is a state diagram depicting a security method in accordance with an embodiment of the present invention.

Referring now to FIG. 5, a state diagram is shown depicting control operations within integrated circuit 10 of FIG. 1 and integrated circuit 10A of FIG. 2. Boot state (state 40) is maintained until reset signal /rst is de-asserted, at which time the stored lockbit is fetched (state 41) and initialization proceeds to state start (state 42). Internal reset signal /irst is asserted until state start (state 42), at which time lock request signal lkrq is now valid. If either of signal locked (from the NV lockbit) or the lock request signal lkrq is asserted, then the lockbit or key is written to the locked state (state 43). When an erase request is received, the non-volatile storage is erased (state 44), but when an external read request is received, the locked state is checked (state 45) via the state of lock signal LOCK, and if lock signal LOCK signal is asserted, the read operation is aborted, otherwise the read operation is performed (state 46). When an ordinary write request is received, a write operation is performed (state 47).

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method for protecting the contents of non-volatile storage in an integrated circuit, the method comprising:
   receiving a reset signal at a first terminal of the integrated circuit;
   receiving a lock prevent signal at a second terminal of the integrated circuit;
   detecting that the reset signal has entered a de-asserted state;
   responsive to detecting that the reset signal has entered the de-asserted state, maintaining an internal reset signal in an asserted state for a predetermined period of time after the reset signal has entered the de-asserted state, wherein the internal reset signal disables external interfaces of the integrated circuit that provide for reading values from the non-volatile storage; and
   locking the non-volatile storage by setting a non-volatile lock value unless the lock prevent signal has been asserted.

2. The method of claim 1, further comprising using the second terminal as a general-purpose input/output pin subsequent to initialization of the integrated circuit.

3. The method of claim 1, wherein the second terminal has a default state set by a device internal to the integrated circuit and corresponding to de-assertion of the lock prevent signal, whereby no external signal connection is required to lock the non-volatile storage by default.

4. The method of claim 3, wherein the device is a pull-up resistor.

5. The method of claim 1, wherein the locking is performed by setting a non-volatile lock bit, and further comprising determining that the non-volatile storage has not been previously locked by examining a state of the lock bit, and wherein the locking is performed only if the non-volatile storage has not been previously locked.

6. The method of claim 1, wherein the locking is performed by setting a non-volatile key value bit, and further comprising determining that the non-volatile storage has not been previously locked by comparing the non-volatile key value to a predetermined value, and wherein the locking is performed only if the non-volatile storage has not been previously locked.

7. The method of claim 1, further comprising:
   reading by a processor core, an indication derived from the lock prevent signal; and
   determining whether the indication indicates that the lock prevent signal was not asserted, wherein the processor core performs the locking responsive to determining that the indication indicates that the lock prevent signal was not asserted.

8. The method of claim 1, wherein the external interfaces include a JTAG interface, and wherein the method further comprises:
   blocking operation of the JTAG interface to read the contents of the non-volatile storage when the internal reset signal is asserted or the locking has been performed; and
   permitting operation of the JTAG interface if the locking has not been performed and the internal reset signal is de-asserted.

9. The method of claim 1, wherein the external interfaces include a serial port programming interface, and wherein the method further comprises:
   blocking operation of the serial port programming interface to read the contents of the non-volatile storage when the internal reset signal is asserted or the locking has been performed; and
   permitting operation of the serial port programming interface if the locking has not been performed and the internal reset signal is de-asserted.

10. An integrated circuit comprising:
   a non-volatile storage element;
   a non-volatile lock value storage;
   a first terminal for receiving an external reset signal;

a second terminal for receiving an external lock prevent signal;

one or more external interfaces that provide for reading values from the non-volatile storage; and a control circuit responsive to the external reset signal and the external lock prevent signal to detect that the reset signal has entered a de-asserted state, maintain an internal reset signal in an asserted state for a predetermined period of time after the reset signal has entered the de-asserted state to disable the external interfaces of the integrated circuit, determine whether the lock prevent signal has been asserted, and if the lock prevent signal has not been asserted, locking the non-volatile storage by setting a locked value of the lock value storage.

11. The integrated circuit of claim 10, wherein the second terminal is used as a general-purpose input/output pin after initialization of the integrated circuit.

12. The integrated circuit of claim 10, further comprising a device for setting a default state of the second terminal such that the lock prevent signal is de-asserted, whereby no external signal connection is required to lock the non-volatile storage by default.

13. The integrated circuit of claim 12, wherein the device is a pull-up resistor.

14. The integrated circuit of claim 10, wherein the control circuit sets a lock bit within the non-volatile lock value storage to lock the non-volatile storage if the lock bit has not been previously set.

15. The integrated circuit of claim 10, wherein the control circuit sets a non-volatile key value as the lock value in the non-volatile lock value storage to lock the non-volatile storage if the non-volatile key value has not been previously set to the lock value.

16. The integrated circuit of claim 10, wherein the control circuit comprises a processor core, and wherein the processor core reads an indication of whether the lock prevent bit has been asserted and locks the non-volatile storage of the lock prevent bit has not been asserted.

17. The integrated circuit of claim 10, wherein the one or more external interfaces include a JTAG interface, wherein the JTAG interface is operable to read the contents of the non-volatile storage when the internal reset signal is de-asserted and if the lock value is not set, and wherein the JTAG interface is inoperable to read the contents of the non-volatile storage when the internal reset signal is asserted or the locking has been performed.

18. The integrated circuit of claim 10, wherein the one or more external interfaces include a serial port programming interface, wherein the serial port programming interface is operable to read the contents of the non-volatile storage when the internal reset signal is de-asserted and if a value in the lock bit storage is not set, and wherein the serial port programming interface is inoperable to read the contents of the non-volatile storage when the internal reset signal is asserted or the locking has been performed.

19. An integrated circuit comprising:

a non-volatile storage element;

a terminal for receiving an external lock prevent signal; and means for locking the non-volatile storage by default at initialization of the integrated circuit unless the external lock prevent signal has been asserted.

20. The integrated circuit of claim 19, further comprising means for preventing reading of values from the non-volatile storage until the integrated circuit has been initialized or the non-volatile storage has been locked.

21. An integrated circuit comprising:

a non-volatile storage element;

an electrical terminal for receiving an external signal for controlling locking of the non-volatile storage against reading of the contents of the non-volatile storage external to the integrated circuit; and control logic for receiving the external signal from the terminal and locking the non-volatile storage in conformity with a state of the external signal.

22. The integrated circuit of claim 21, wherein the electrical terminal is used as a general-purpose input/output terminal after initialization of the integrated circuit.

* * * * *